United States Patent Office 3,466,313
Patented Sept. 9, 1969

3,466,313
BIS[4,4'-DIPHENYLMETHYL] BIBENZYL-BIS (HEXACHLOROANTIMONATE)
Irving Kuntz, Westfield, and Robert M. Thomas, Mountainside, N.J., assignors to Esso Research and Engineering Company, a corporation of Delaware
No Drawing. Original application Apr. 8, 1965, Ser. No. 446,714. Divided and this application Aug. 27, 1968, Ser. No. 777,528
Int. Cl. C07f 9/92
U.S. Cl. 260—446                                              1 Claim

ABSTRACT OF THE DISCLOSURE

This invention relates to bis [4,4'-diphenylmethyl] bibenzyl-bis (hexachloroantimonate) which is useful as a catalyst in polymerization reactions between tetrahydrofuran and cyclopentadiene alone or in the presence of an oxirane or oxetane compound.

---

The present application is a divisional of S.N. 446,714 filed Apr. 8, 1965.

The present invention relates to new tetrahydrofuran-cyclopentadiene polymers and a method for their preparation. More particularly, the invention is directed to copolymers of tetrahydrofuran and cyclopentadiene and also terpolymers of tetrahydrofuran, cyclopentadiene and a third oxirane or oxetane comonomer and to a method for their preparation.

Various copolymers of tetrahydrofuran (tetramethyleneoxide) with other materials have been reported as being prepared with various types of polymerization initiators. Moerwein, in German Patent No. 914,438 found that copolymers of tetrahydrofuran with ethylene oxide could be prepared utilizing borontrifluoride or antimony trichloride but not aluminum chloride or zinc chloride polymerization initiators. Most of the polymers described as being formed with the catalyst systems of the prior art are characterized as being mobile or viscous liquids.

Now in accordance with this invention, polymer products capable of a wide variation in form and utility are prepared by polymerizing tetrahydrofuran with a monomer system made up of either cyclopentadiene alone or cyclopentadiene and an oxirane or oxetane compound. The polymerization is conveniently conducted at relatively low temperatures and at mild pressures in the presence of aromatic diluents or in bulk with a mono or bis di- or tri-aryl methyl carbonium ion salt catalyst. Depending upon the proportions of monomers in the final polymer composition, the products of this invention may be elastomers which can be vulcanized with sulfur and accelerators, surface coatings which may be applied from a solvent vehicle to form crosslinked films on air drying or thermoplastic compositions.

As stated above, the polymers encompassed by the present invention include copolymers of tetrahydrofuran with cyclopentadiene as well as terpolymers of tetrahydrofuran, cyclopentadiene, and an oxirane (1,2-epoxide) or oxetane (1,3-epoxide) compound. The generic formula for these epoxide compounds may be represented as:

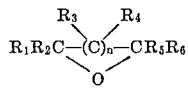

wherein any of $R_1$ through $R_6$ is a hydrogen, a $C_1$ to $C_{10}$ alkyl group, a $C_1$ to $C_4$ haloalkyl, a $C_6$ to $C_{10}$ aryl or a $C_2$ to $C_4$ ether. Preferably, the value of the R's are $C_1$–$C_4$ alkyls or haloalkyls. The value of $n$ in the above formula is equal to 0 or 1 and when $n$ is equal to 0 it is necessary that at least either $R_2$ or $R_5$ be a hydrogen radical. The R groupings may be the same or a different moiety within the limits of the above formula.

Representative non-limiting examples of useful oxirane and oxetane compounds include ethylene oxide, propylene oxide, epichlorohydrin, trimethylene oxide, styrene oxide, allyl glycidyl ether, 2-phenyl oxetane, 3,3-bis (chloromethyl) oxetane, 1,2-dodecane oxide, 1,4-cyclohexane oxide, and 1,2-epoxy-5,6 trans-9,10-cis-cyclododecadiene. The preferred epoxide compounds are propylene oxide, 3,3-bis(chloromethyl) oxetane and allyl glycidyl ether.

The present polymerization process may be carried out in bulk such as in an excess of tetrahydrofuran. Additionally, solvent polymerization techniques may also be used. Aromatic hydrocarbons that are liquid at the conditions of temperature and pressure used in the polymerization reaction are preferred for use in the pocess of this invention. Repesentative examples of suitable solvents include benzene, toluene, ethylbenzene, xylene, nitrobenzene, and the like. Mixtures of aromatic solvents with alicyclic solvents, for example, toluene and cyclohexane, may be used. Halogenated materials such as methyl chloride or methylene chloride should be avoided.

The catalyst system employed in preparing the copolymers and terpolymers of this invention comprises at least one di- or tri-arylmethyl carbonium ion salt. Mono or bis carbonium ion salts are effective catalysts. The general structure of the desired carbonium ion salt may be represented by the following formula:

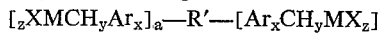

wherein Ar is a phenyl or naphthyl group or an alkyl-substituted phenyl or naphthyl group. Each of the Ar groups may be the same or a different aromatic moiety. The value of M in the above formula is a cation which may be selected from the group consisting of antimony, tin, aluminum, boron, zinc, iron, titanium, zirconium, vanadium, and galenium. The value of $x$ represents a common halide having an atomic number of less than 53, i.e. chlorine, bromine, fluorine, or a mixture of the same. The value of $x$ is an integer of from 2 to 3; the sum of $x$ and $y$ must be equal to 3; $z$ is equal to the highest valence of the cation M+1; $a$ is an integer of from 0 to 1 and when $a$ equals 0, R' is hydrogen and when $a$ is equal to 1, R' is an ethylene group (—$C_2H_4$—).

Representative examples of useful arylmethyl carbonium ion salt catalyst include triphenylmethyl antimony hexachlordie (triphenylmethyl hexachloroantimonate), triphenylmethyl aluminum tetrachloride, triphenylmethyl tin pentachloride, triphenylmethyl boron tetrachloride, triphenylmethyl boron tetrafluoride, triphenylmethyl diethyl aluminum dichloride, triphenylmethyl-chloro-boron trifluoride, triphenylmethyl-bromo-antimony pentachloride, diphenylmethyl antimony hexachloride, bis[4,4'-diphenylmethyl]bibenzyl-bis(hexachloroantimonate), etc. The preferred aryl group in the carbonium ion catalyst is a phenyl radical and the preferred cation is antimony. The most preferred salt is triphenylmethyl antimony hexachloride. The total amount of catalyst employed in the polymerization reaction varies with the choice of monomers to be polymerized and the choice of components of the catalyst system, but is generally in the range of from about 0.005 to 0.2 mole of catalyst per 100 moles of monomers.

The conditions at which the polymerization reaction is conducted can vary over a wide range. Generally, temperatures ranging from −80° to 50° C. can be used; however, temperatures ranging from −30° to 30° C. are preferred. The pressure at which the polymerization is carried out is not critical and pressures ranging from 0.2 to 1000 p.s.i.g. can be employed in the polymerization reaction. Pressures in the range of from about 1 atmosphere to 10 atmospheres are most generally used. The reaction time used in the formation of the preferred copolymers and terpolymers depends in general upon the temperatures used. Generally, reaction times can vary from minutes to weeks; however, it is more usual to use reaction times ranging from about 0.25 to 100 hours.

The reaction vessel can be constructed of any material that is inert to the reactants and diluents used, and is capable of withstanding the operating pressures. Reaction vessels made of glass, stainless steel and glass-lined steel are satisfactory.

In a typical polymerization procedure, a glass reaction vessel is charged with benzene and a catalytic amount of triphenylmethyl tetrafluoroborate. To this mixture of catalyst and solvent is then introduced a monomer mixture consisting of tetrahydrofuran, cyclopentadiene and trimethylene oxide. In general, about 0.005 to 0.2 mole of catalyst is used per 100 moles of monomer. The glass reaction vessel containing the reaction mixture is then sealed and placed in a constant temperature bath, maintained at a temperature ranging from $-30°$ to $+30°$ C. The reaction vessel and its contents are continuously tumbled in the constant temperature bath during the period of reaction. Polymer isolation and catalyst removal can be achieved utilizing a variety of techniques. In one procedure, the polymer solution is introduced into excess non-solvent such as methanol or water to precipitate the polymer. Prior to precipitation the polymer solution can be washed with aqueous acid or base to effectively remove and deactivate catalyst residues. If desired, additives and stabilizers may be introduced into the polymer solution prior to precipitation. An especially attractive finishing process involves the introduction of the polymer solution into a body of hot water containing acidic or basic deashing agents and whatever additives or stabilizers as may be desired.

The copolymer and terpolymer products of the present invention as procured by the above process exhibit molecular weights ranging from about 500 to 1,000,000. Molecular weight determinations in the case of high molecular weight polymers is secured by membrane osmommetry or in the case of lower molecular weight materials by vapor phase osmommetry. The copolymer and terpolymer products exhibit intrinsic viscosities ranging from about 0.05 to 5.0 as determined in benzene at a temperature of 25° C. at a polymer concentration of from 0.05 to 0.50 gram of polymer per 100 cc. of solution. The polymers produced are soluble in tetrahydrofuran, benzene, chloroform, toluene, cyclohexane, and methylene chloride.

The copolymers and terpolymers of this invention can be designed for different end uses. The high molecular weight polymers containing at least about 75 mole percent tetrahydrofuran residues with the remaining 25% of the composition being either cyclopentadiene or cyclopentadiene and an oxirane or oxetane compound residues are highly useful elastomers. The products may be vulcanized by using sulfur and accelerators such as 2-benzothiazyl disulfide, mercaptobenzothiazole, cyclohexyl-2-benzothiazyl sulfenamide, tellurium diethyl dithiocarbamate, etc. Carbon blacks such as the channel blacks, furnace blacks and thermal blacks and/or mineral fillers such as the oxides, hydroxides, carbonates, etc. of silicon, aluminum, magnesium, titanium, or the silicates or aluminates of the various elements indicated may be compounded with the elastomeric products of the present invention.

Polymers containing more than about 30 mole percent cyclopentadiene residues tend to be thermoplastic materials. Such polymers may be molded and pressed or cast into films. Lower molecular weight products of this type are especially useful as components for varnish and paint formulations although the more insoluble high molecular weight products can be used. These polymer products air-dry to a hard, tack-free surface. The elastomeric products of this invention may be utilized in the preparation of tires, inner tubes, hose and tubing, wire and cable coatings, mechanical goods, as well as for a wide variety of coated and molded articles.

This invention and its advantages will be better understood by reference to the following examples:

Example 1

A series of polymerization tests were conducted to illustrate the effectiveness of the catalyst system of the present invention for the copolymerization of tetrahydrofuran and cyclopentadiene. In every instance, the test was carried out in a sealed glass reaction vessel. The reaction system was made up of dimer-free cyclopentadiene, tetrahydrofuran and a triphenylmethyl hexachloroantimonate catalyst in the amounts specified in each of the runs. The polymerization was conducted in bulk at a temperature of 7° C. for a period of 72 hours. After the completion of the polymerization reaction the total reaction mixture was poured into excess methanol to precipitate the polymer product. The polymer product thus obtained was then vacuum oven dried and tests were conducted to determine the polymer inherent viscosity and polymer structure. Inherent viscosity measurements were made in benzene solution at 25° C. Copolymer structure, i.e. the amount of cyclopentadiene and tetrahydrofuran present in the polymer, was determined by nuclear magnetic resonance measurements of 10% solutions in carbon tetrachloride. The results of the tests are set forth in Table I below:

TABLE I

| Run | Feed | | | | Polymer | | | |
|---|---|---|---|---|---|---|---|---|
| | CPD[1] (ml.) | THF[2] (ml.) | Mole percent CPD[1] | Catalyst (mg.) | Yield (gr.) | Inherent viscosity (avg.) | Mole percent CPD[1] | Mole percent THF[2] |
| 1 | 0.5 | 19.5 | 2.5 | 40 | 3.6 | 1.95 | 3.4 | 94.6 |
| 2 | 1.0 | 19.0 | 5.2 | 40 | 5.4 | 1.88 | 8.0 | 92.0 |
| 3 | 2.0 | 18.0 | 11.0 | 40 | 5.2 | 1.37 | 14.0 | 86.0 |
| 4 | 10.0 | 50.0 | 16.4 | 120 | 11.9 | 0.85 | 46 | 54 |

[1] Cyclopentadiene. [2] Tetrahydrofuran.

The above tests indicate that copolymers of tetrahydrofuran and cyclopentadiene containing various amounts of each of the monomers are readily formed with the catalyst system of the present invention. The polymers thus formed contain varied amounts of unsaturation.

The polymer described in Run 4 of Table I was formulated as a solution containing 50% solids in toluene for testing as a varnish. It was applied to a carbon steel panel and air-dried to a tack-free finish in two hours. After drying for a total period of five hours at room temperature, the film exhibited an H hardness in a pencil-hardness test.

Example 2

A further series of tests were conducted to demonstrate the effectiveness of the catalyst system of the present invention for the terpolymerization of tetrahydrofuran, cyclopentadiene, and an epoxide compound. Each test was carried out in a 30 ml. glass reaction vessel using 40 mgs. of triphenylmethyl hexachloroantimonate. The polymerization was conducted in bulk at a temperature of 7° C. for a period of 40 hours. The amounts of monomers used in the formation of the polymer are set forth in the table. Inherent viscosity measurements and the percentage of epoxide compound present in the polymer using infrared spectroscopy were determined. The results of the tests are set forth in Table II below:

TABLE II

| Run | Feed | | | Terpolymer | | |
|---|---|---|---|---|---|---|
| | CPD[1] (ml.) | AGE[2] (ml.) | THF[3] (ml.) | Yield (gr.) | Inherent viscosity | Mole percent AGE[2] |
| 1 | 0.50 | 1.0 | 20.0 | 15.2 | 0.83 | 3.1 |
| 2 | 0.25 | 1.0 | 20.0 | 15.4 | 0.83 | 2.6 |
| 3 | 0.10 | 1.0 | 20.0 | 15.4 | 0.78 | 2.8 |

[1] Cyclopentadiene.  [2] Allyl glycidyl ether.  [3] Tetrahydrofuran.

During the course of the terpolymerization a transient blue color of the polymerization solution was observed. This blue color was also produced during the copolymerization of tetrahydrofuran with cyclopentadiene. This observation indicates that the small amounts of cyclopentadiene present were terpolymerized in the experiments set forth in Table II with the catalyst system of the present invention. The polymers obtained contained minor amounts of unsaturation and are readily vulcanized to solvent and oil-resistant vulcanizates.

Example 3

An additional series of tests were conducted to demonstrate the flexibility possible with the process of this invention by the preparation of terpolymers of tetrahydrofuran, cyclopentadiene and a third oxirane or oxetane comonomer. Each test was carried out in a 30 ml. glass reaction vessel using amounts of triphenylmethylhexachloroantimonate catalyst specified in each of the runs. Polymerizations for all charges were carried out in bulk at a temperature of 7° C. for 45 hours. The amounts of monomers used in the formation of the polymers are set forth in the table. Polymer products were isolated from the reaction solution by precipitation into methanol. All products were insoluble in this solvent except the product from Run 3 where the amounts of propylene oxide residues in the terpolymer were sufficient to lead to solubility in methanol. In this instance the polymer product was isolated by evaporating the reaction solvent and the methanol from the product. The results of the tests are set forth in Table III below:

weight stearic acid, 5 parts by weight zinc oxide, 2 parts by weight white lead, 2 parts by weight sulfur, 1 part by weight (Altax) benzothiazyl disulfide, and 1.5 parts by weight (Tuads) tetramethyl thiuram disulfide. The total composition was then cured into a pad at 300° F. for a period of 60 minutes. The pad was subsequently cut into a standard dumbbell and tested under ASTM conditions of temperature and humidity on a Scott Micro-Tensile Tester. The cured sample exhibited a tensile strength of 1330 p.s.i. and an elongation at break of 350%. The modulus at 300% extension was 1250 p.s.i.

The cured polymers of the present invention also exhibit solvent and oil resistant properties. For example, the weight percent increase of the above cured terpolymer in ASTM No. 3 oil at 100° C. was 146%. Styrene-butadiene rubber or butyl rubber vulcanizates, with similar proportions of fillers, illustrate a weight percent increase ranging from 300 to 400%, or even more, in the same test. The room temperature weight percent increase in ASTM No. 3 oil of the cured terpolymers of this invention was 24%; a vulcanizate of Neoprene W, a well-known, oil-resistant elastomer, showed a 34% weight increase in the same test.

Example 5

Bis[4,4' - diphenylmethyl]bibenzyl - bis(hexachloroantimonate) was prepared by reacting 0.5 gram of 4,4'-bis(chlorodiphenylmethyl)bibenzyl in 20 ml. of carbon tetrachloride with two times the theoretical amount of $SbCl_5$. Upon mixing, a brown salt immediately precipitated. This product was recrystallized from a mixture of carbon tetrachloride and methylene chloride and analyzed for carbon, hydrogen and chlorine content.

The desired product has an empirical formula of $C_{40}H_{32}Cl_{12}Sb_2$ with a calculated carbon content of 40.65 wt. percent, a hydrogen content of 2.73 wt. percent and a chlorine content of 36.01 wt. percent. The analysis revealed a carbon content of 40.94 wt. percent, a hydrogen content of 2.74 wt. percent and a chlorine content of 35.96 wt. percent.

TABLE III

| Run | THF[1] | CPD[2] | PO[3] | BCMO[4] | Catalyst (mg.) | Yield (gr.) | Inherent viscosity[5] |
|---|---|---|---|---|---|---|---|
| 1 | 20 | 1 | 1 | 0 | 40 | 15.4 | 1.26 |
| 2 | 20 | 1 | 4 | 0 | 50 | 16.2 | 0.94 |
| 3 | 20 | 2 | 10 | 0 | 50 | 5.8 | 0.70 |
| 4 | 20 | 1 | 0 | 1 | 40 | 7.8 | 1.04 |

[1] Tetrahydrofuran.
[2] Cyclopentadiene.
[3] Propylene oxide.
[4] 3,3-bis (chloromethyl) oxetane.
[5] Determined in benzene at 25° C.

The data of Table III above demonstrates that terpolymers consisting of tetrahydrofuran, cyclopentadiene and various other oxirane and oxetane compounds can be prepared according to the process of this invention. The terpolymers secured contain minor amounts of unsaturation and are readily vulcanized with conventional curing agents and accelerators.

Example 4

To demonstrate the curability of certain types of the polymers formed with the catalyst system of the present invention, 100 parts by weight of the polymer of Run 1 of Table II was compounded on a rubber roll mill with 50 parts by weight of high abrasion furnace black, 1 part by weight of phenyl-β-naphthylamine, 1 part by weight of (PX–441) 2,6-ditertiary butyl-p-cresol, 2 parts by A mixture consisting of 2 ml. cyclopentadiene and 18 ml. of tetrahydrofuran is polymerized with a 40 mg. portion of the bis carbonium ion salt prepared above at a temperature of 7° C. for 72 hours. The resulting polymer is an elastomeric substance that is readily cured with sulfur and conventional accelerators.

Further advantages of this invention will be apparent to those skilled in the art. Polymers of tetrahydrofuran, cyclopentadiene and an epoxide compound can be prepared with the process of the present invention. It is to be understood that this invention is not limited to the specific examples set forth herein, which have been offered merely as illustrations, and that modifications may be made without departing from the spirit and scope of the appended claim.

What is claimed is:

1. Bis[4,4' - diphenylmethyl]bibenzyl - bis(hexachloroantimonate).

References Cited

UNITED STATES PATENTS

| | | | |
|---|---|---|---|
| 3,132,166 | 5/1964 | Harrison | 260—440 |
| 3,133,106 | 5/1964 | Harrison | 260—440 |
| 3,133,107 | 5/1964 | Harrison | 260—440 |
| 3,152,160 | 10/1964 | Harrison | 260—440 |
| 3,328,445 | 6/1967 | Harrison | 260—440 |
| 3,251,881 | 5/1966 | Susi et al. | 260—446 X |

TOBIAS E. LEVOW, Primary Examiner

W. F. W. BELLAMY, Assistant Examiner

U.S. Cl. X.R.

252—431; 260—429.7, 448, 606.5, 429.9, 439, 429.5, 429.3, 429